Jan. 28, 1969 R. C. KELLEY 3,424,424
DOUBLE REAR VIEW MIRROR FOR VEHICLES
Filed July 31, 1967 Sheet 1 of 2
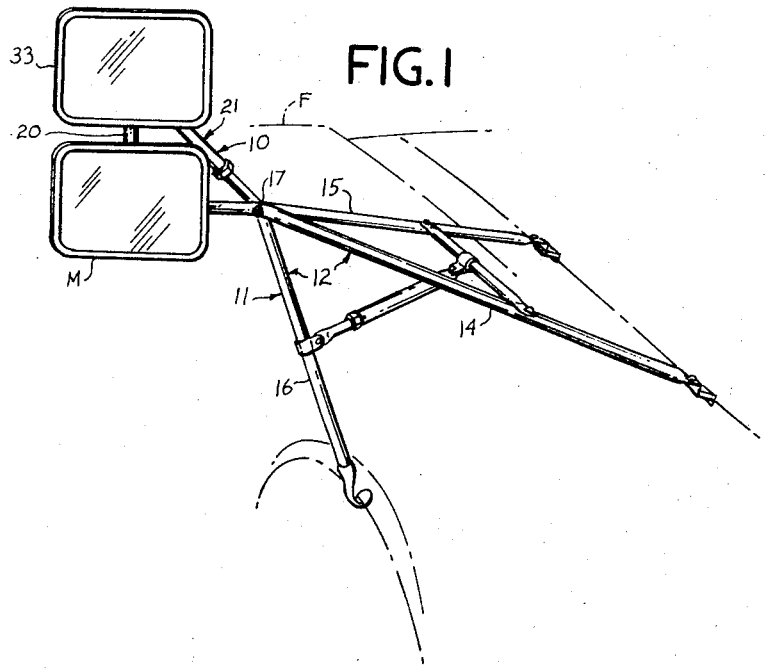
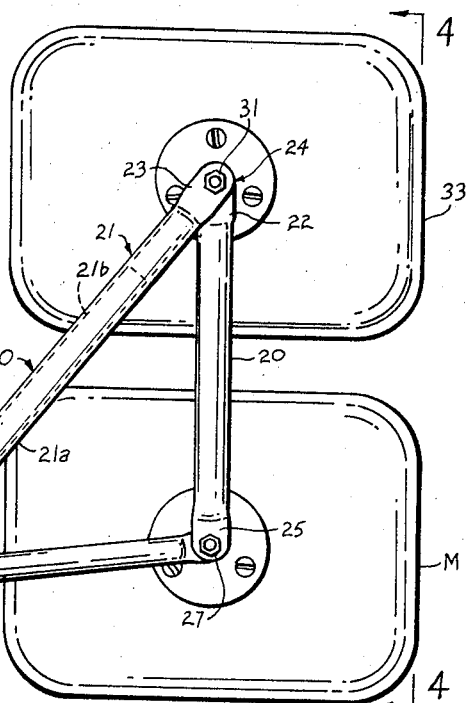
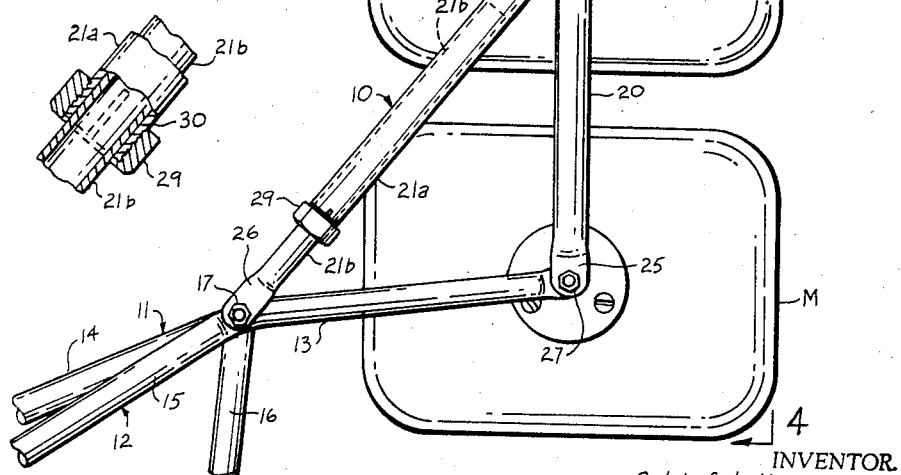
INVENTOR.
Ralph C. Kelley
BY William Cleland
Attorney Jan. 28, 1969 R. C. KELLEY 3,424,424

DOUBLE REAR VIEW MIRROR FOR VEHICLES

Filed July 31, 1967

INVENTOR.
Ralph C. Kelley
BY William Boland
Attorney

United States Patent Office 3,424,424
Patented Jan. 28, 1969

3,424,424
DOUBLE REAR VIEW MIRROR FOR VEHICLES
Ralph C. Kelley, 207 South Ave.,
Tallmadge, Ohio 44278
Filed July 31, 1967, Ser. No. 657,323
U.S. Cl. 248—486      7 Claims
Int. Cl. B60r *1/08;* A47g *1/24*

ABSTRACT OF THE DISCLOSURE

Combination with outside rear view mirror device having supporting frame means, attachable to vehicle body, including rigidly positioned member and a first mirror angularly adjustably mounted on member, of a pair of elongated elements angularly adjustably connected at ends to form knee joint, other ends of elements being affixed to member at selected angle of elements to present knee joint in requisite spaced relation to first mirror. Second mirror on knee joint adjustable independently of first mirror.

*Background of invention*

In the past, various means have been provided for mounting outside mirrors on automotive vehicles. These, however, have been limited to provision of single outside rear view mirror arrangements for use by the vehicle driver only. When, therefore, a vehicle was in use for hauling wide trailers, such as a house trailer, it was often difficult for a driver to see what was behind the trailer, especially when backing up. As such rear view mirrors were necessary for driver use, a passenger riding beside the driver was of little or no help in backing-up operations or driving in congested traffic.

*Summary of invention*

The present invention has to do with outside rear view mirrors of known type, including a framework of rods or pipes which are removably attachable to a vehicle body forwardly of the usual windshield. The invention comprises the combination with such an arrangement of a second mirror mounted on an auxiliary device which is easily attachable onto a rigid arm of an aforesaid framework carrying a first mirror for driver use the adjustable device being selectively adjusted to position a second mirror for exclusive use by passenger riding beside the driver. With one such combination mirror arrangement on each side of the vehicle, the passenger is able to observe traffic behind a trailer on both sides of the same.

One subject of the present invention is to provide a double rear view mirror arrangement on both sides of a vehicle by which both the driver and passenger beside him may view the traffic behind a trailer being hauled by the vehicle.

Another object of the invention is to provide an adjustable auxiliary mirror unit for attachment to existing outside rear view frameworks of substantially varying structural designs.

Other objects of the invention will be manifest from the following brief description and the accompanying drawings.

Of the accompanying drawings:

FIGURE 1 is a perspective view of a rear view mirror device attached in position of use to a vehicle body forwardly of the usual windshield thereof, and having attached thereto an auxiliary rear view mirror unit of the invention.

FIGURE 2 is an enlarged fragmentary rear view of the upper portion of the double rear view mirror arrangement shown in FIGURE 1.

FIGURE 3 is an enlarged fragmentary view, partly broken away and in section, of a portion of a telescopic element of the structure best shown in FIGURE 2.

Figure 4:
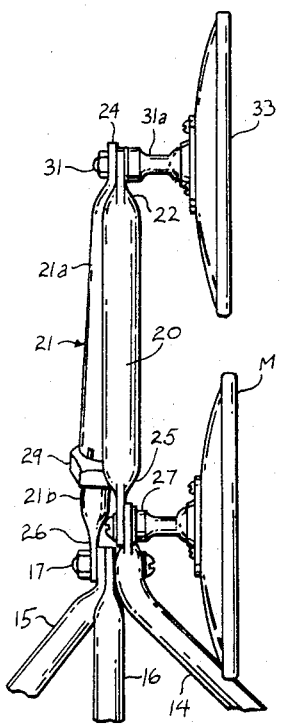
FIGURE 4 is a fragmentary edge view taken on the line 4—4 of FIGURE 2, on the same scale as FIGURE 2.

Referring particularly to FIGURES 1, 2, and 3, there is illustrated a double outside rear view mirror arrangement incorporating the auxiliary mirror attachment 10 of the invention on an existing mirror unit 11, which includes a framework 12 adjustably attachable to the front fender F of an automobile, as indicated in chain-dotted lines in FIGURE 1, to present an elongated rigid arm 13 freely laterally outwardly of fender F at a point well forwardly of the usual vehicle windshield (not shown). As best shown in the rear view in FIGURE 2, the framework 12 may be of tripod construction in which three rigid rods or members 14, 15, and 16 are pivotally connected at a juncture point 17, as by means of a suitable bolt, the rigid arm 13 being an integral rigid extension of the member 14 from point 17.

The auxiliary mirror unit 10 may include a pair of elongated rigid elements 20 and 21 which are angularly adjustably connected by bolt means 31 at ends 22 and 23, respectively, of said elements to form a knee joint 24, the angle of which in conjunction with the length of the elements 20 and 21 is such that the other ends 25 and 26 of the same may be readily connected to the bolt 17 and a bolt 27 at the free end of extension 13, as shown in FIGURES 2 and 4. Ready adjustability of knee 24 may be further improved by making one element 21 extensible to selected length, as by providing the same as two telescopic parts 21a and 21b designed to be locked together, as by adjustment of the nut 29 on a slotted and threaded end 30 of the larger tubular part 21a, so that the slotted end is contracted into tight grip with the smaller part 21b, as shown in FIGURE 3. The bolt means 31 at the knee joint 24 includes an integral extension 31a on which is swivelly connected a second mirror 33, to be spaced well above a similar swivel extension of bolt 27 of the first mirror M so that the two mirrors 33 and M are adjustable independently of each other.

In use of the improved double mirror arrangement shown in FIGURES 1, 2, and 4, a vehicle hauling a house trailer (not shown) makes it possible to set the two mirrors 33 and M so that the vehicle driver and his passenger can both watch traffic to the rear of the trailer and thereby avoid many of the hazards of driving under such conditions.

Figure 5:
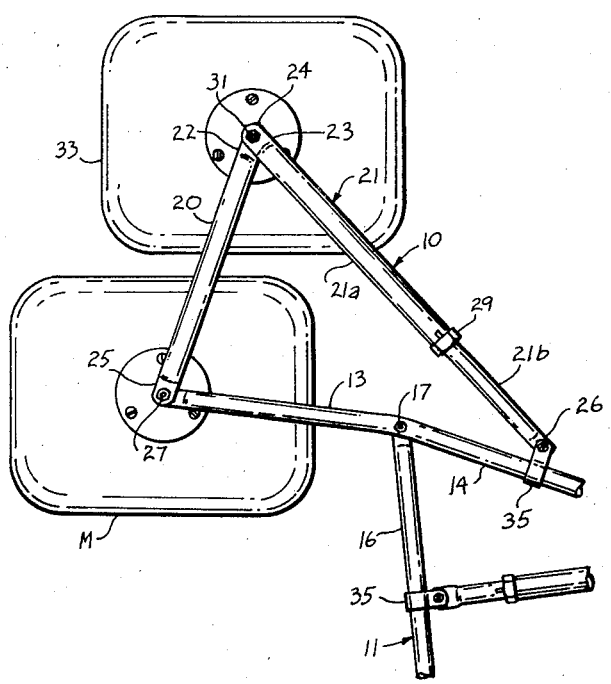
FIGURE 5 is a rear view corresponding to FIGURE 2, but on a reduced scale, illustrating a different arrangement of the double mirror adapter device shown in FIGURE 1 to 4, adjusted for use with an existing rear view mirror device of somewhat different construction.

FIGURE 5 shows a different arrangement of an existing framework 12a with an auxiliary mirror unit 10 attached substantially as shown in FIGURE 2, except that the telescopic arm 10 is attached at its inner end to a clip 35, which is clamped about the framework leg 16 at a point inwardly of the connecting point 17.

Figure 6:
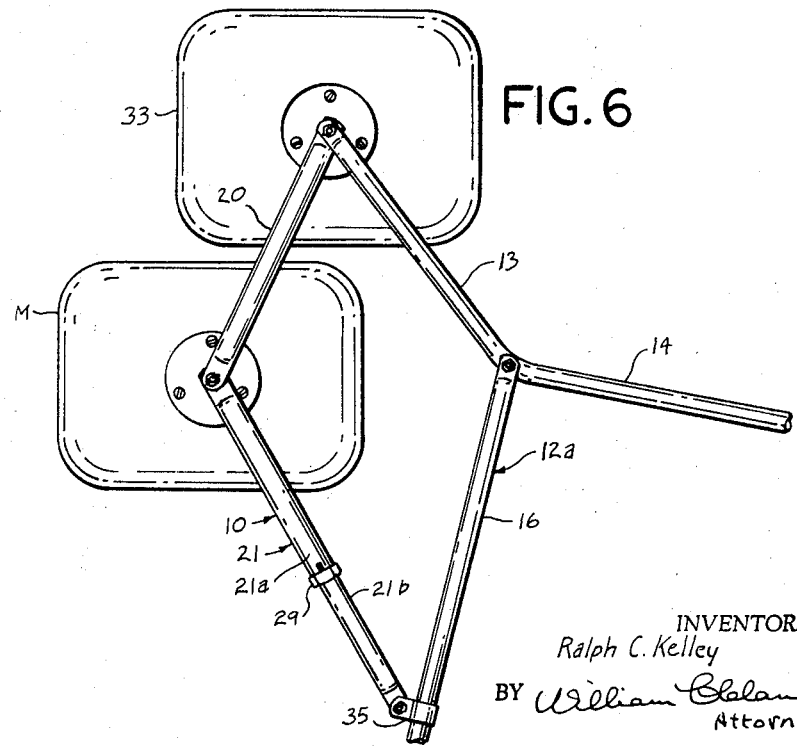
FIGURE 6 is a view corresponding to FIGURE 5, illustrating still another adjusted arrangement of the rear view adapter device to a different existing mirror device.

FIGURE 6 shows another fixed adjustment of the auxiliary unit 10 in a manner similar to that of FIGURE 5, but in a different configuration of elements indicated by a different arrangement of legs on the framework 12a, forming a diamond shape rather than the triangular shape as in FIGURES 2 and 5. It is readily apparent, therefore, that the auxiliary mirror unit 10 with or without the use of clips 35 may be easily mounted in a multiplicity of different ways on a wide range of designs of frameworks 12 (or 12a) of different existing outside mirror units.

Generally, therefore, the two adjustably pivotally connected elements 20 and 21 are variously rigidly attachable to fixed framework extensions 13 to form a rigid unit, which can be varied in shape and size by extension or contraction of the lengthwise adjustable element 21 to selected fixed lengths thereof. In some instances the adjustable element may be attached to a fixed part of the framework through collar or clip 35 adjustably attached to said fixed part, as shown in FIGURES 5 and 6.

Other modifications of the invention may be resorted to without departing from the spirit thereof.

What is claimed is:

1. A combination with an outside rear view mirror device having supporting frame means attachable to a vehicle body, and including a rigidly positioned member thereon and a first mirror angularly adjustably mounted on the member, of a pair of elongated rigid elements angularly adjustably connected at first ends thereof to form a knee; means at the other ends of said elements for adjustably attaching said other ends to said member at a selected fixed angle between the elements to present the knee joint in a predetermined relatively fixed location with reference to said first mirror; and a second mirror adjustably mounted on said knee joint for angular adjustment thereof independently of the adjustments of said first mirror.

2. A combination as in claim 1, one said element having parts longitudinally adjustable to selected fixed lengths of the same.

3. A combination as in claim 2, said longitudinally adjustable parts being telescopically connected, and means being provided for locking the parts in selected positions of telescopic adjustment.

4. A combination with an outside rear view mirror device having supporting frame means attachable to a vehicle body and including an elongated rigid arm and a first mirror angularly adjustably mounted at an attaching point on an outwardly presented end of the arm, of a pair of elongated rigid elements angularly adjustably connected to form a knee; means at the other ends of said elements for adjustably attaching said knee to the rigid arm at a selected fixed angle between the elements to support the knee rigidly on the frame means to have the knee joint in a predetermined relatively fixed location with reference to said first mirror attaching point; and a second mirror adjustably mounted on said knee joint for angular adjustment about the same independently of the angular adjustments of said first mirror.

5. A combination as in claim 4, at least one said element having telescopically connected parts, and means for locking the same in selected positions of telescopic adjustment.

6. An auxiliary rear view mirror unit for an outside rear view mirror device having frame means attachable to a vehicle body, including an elongated rigid arm and a first mirror angularly adjustably mounted at an attaching point on a freely presented end of the arm, comprising: a pair of elongated rigid elements angularly adjustably connected to form a knee; means at the other ends of said elements for adjustably attaching said knee to the rigid arm at a selected fixed angle between the elements to support the knee rigidly on the frame means to have the knee joint in a predetermined relatively fixed location with reference to said first mirror attaching point; and a second mirror adjustably mounted on said knee joint for angular adjustment about the same independently of the angular adjustments of said first mirror.

7. A mirror unit as in claim 6, at least one of said elements being longitudinally adjustable to selected fixed lengths for changing the angular relationships of said elements with reference to said arm.

References Cited

UNITED STATES PATENTS

| | | | |
|---|---|---|---|
| 2,413,894 | 1/1947 | Sorensen | 248—485 |
| 2,458,117 | 1/1949 | Tolbert | 248—279 |
| 2,545,777 | 3/1951 | Hardin | 248—279 |
| 3,259,349 | 7/1966 | Lee | 248—485 X |
| 3,372,897 | 3/1968 | Lee | 248—480 |

ROY D. FRAZIER, *Primary Examiner.*

FRANK DOMOTOR, *Assistant Examiner.*

U.S. Cl. X.R.

248—286; 350—299